UNITED STATES PATENT OFFICE.

HANS A. FRASCH, OF CLEVELAND, OHIO.

PROCESS OF REFINING PETROLEUM.

SPECIFICATION forming part of Letters Patent No. 525,811, dated September 11, 1894.

Application filed January 17, 1894. Serial No. 497,176. (No specimens.)

*To all whom it may concern:*

Be it known that I, HANS A. FRASCH, a citizen of the United States, residing at Cleveland, in the county of Cuyahoga and State of Ohio, have invented a certain new and useful Improvement in Processes of Refining Petroleum, of which the following is a full, clear, and exact description.

The Canadian, Ohio and Indiana petroleums contain certain sulfur combinations and unsaturated hydrocarbons which render it impossible to refine them properly by the ordinary sulfuric acid treatment as employed for Pennsylvania and similar petroleums.

My invention relates to a method of removing these sulfur combinations in a convenient and economical manner. In treating petroleum containing sulfur compounds with chloride of lime or chloric oxid or a lye containing free chlorine or chloric oxid, the removal from the oil of such chloric body or element as heretofore proposed does not remove from the oil all of the oxidized or chloric organic bodies produced by the treatment with the chlorine body, but only removes such products as are soluble in water or alkali and does not remove those chloric or oxidized bodies which are insoluble in water and alkali but soluble in petroleum. The removal of these compounds by transforming the same into compounds which are insoluble in petroleum or oil is the basis of my invention; and to this end, the invention consists in treating the chlorinated oil with a substance capable of forming a double salt with the organic chloric salt contained in the oil, whereby a compound insoluble in petroleum is formed which will precipitate therefrom, or, if found to be soluble in water, may be washed out, all as I will proceed now to describe and finally claim.

In carrying out my invention, I place the ordinary quantity of petroleum in an agitator, such as now used in the ordinary refinery, and add to that a solution of chloride of lime in lime water, which solution I preferably use in a saturated state. This solution I add in a small continuous stream to the oil, while the oil is kept in a state of agitation, mechanically or by air pressure, or otherwise. The addition of the liquor is interrupted at times long enough to permit the taking of a sample, which sample is subjected to treatment with a solution of sodium plumbate. If the oil sample upon addition of sodium plumbate assumes a dark or yellow color, the addition of chlorine solution is resumed until a sample withdrawn shows no more discoloration if treated with sodium plumbate. When this point is reached in the treatment, the addition of further quantities of chloride of lime solution and the agitation are stopped and the mixture is permitted to rest until the watery solution has settled off from the oil, when it is separated from the latter and drawn off from the bottom of the agitator. The oil remaining in the agitator is repeatedly washed with water until a sample of the wash water does not show the presence of chlorine upon addition thereto of nitrate of silver solution. The oil is then again permitted to rest and the water is drawn off from the bottom. The last traces of water and moisture in the oil are removed by agitating the oil with a small quantity of sulfuric acid, when the oil is again permitted to rest until the sulfuric acid is settled off, when the latter is drawn off. The oil remaining in the agitator is then treated with the ordinary quantity of sulfuric acid in the well known manner. The acid treatment completed, the acid is removed from the agitator and the oil washed with water, left to settle and the water drawn off. At this point of the treatment, there are no more sulfur products, but there are some chloric products, in the petroleum, and to remove these chloric products, I subject the oil to treatment with a solution of sodium plumbate, which latter I produce by saturating a solution of caustic soda with litharge or oxid of lead. The oil, together with the plumbate of sodium solution, is agitated until a sample of the oil previously washed with water if shaken with a solution of silver nitrate does not show the presence of chlorine. While it is known to me that sodium plumbate has been used for treatment of petroleum containing sulfur compounds for the purpose of removing the free sulfur products, my invention distinguishes itself from that method in that I previously destroy sulfur compounds before treating with sodium plumbate, and only apply the plumbate to remove the chloric products. When the treatment with sodium plumbate has been completed the oil is left to settle and the sodium solution is drawn off. The oil is then repeatedly washed with water and dried in the ordinary manner.

Crude oil may be desulfurized by this method by first chlorinating the same, then distilling and finally treating the distillate with sulfuric acid and plumbate of soda as described.

Instead of plumbate of soda, the basic chloride of lead or any substance which will combine with the chloric hydrocarbon products may be employed.

Heretofore chlorine has been used for deodorizing petroleum but in acid solution, or it has been left in the oil, but I deem it essential to remove practically all traces of the chlorine and the resulting chloric combinations of hydrocarbons, in order to obtain a good illuminating oil, as otherwise, in course of time, and by burning the oil, hydrochloric acid is formed.

I do not limit my invention to the use of the various reagents in the order hereinabove described, since for example, the sodium plumbate might be employed before the acid treatment, but inasmuch as that would require an additional treatment with alkali after the acid is used, I prefer the order first described.

What I claim is—

The process of refining petroleum or its distillates, which consists in transforming the sulfur and basic bodies contained therein into oxidized and chloric products by treatment with a substance containing free chlorine or chloric oxid, removing the soluble compounds by washing with water, taking up the compounds soluble in acid by treatment with sulfuric acid, converting the remaining chloric bodies into a double salt, which is insoluble in the oil, by treatment with a basic metallic salt, and finally removing such double salt by decantation or otherwise, substantially as described.

In testimony whereof I have hereunto set my hand this 16th day of January, A. D. 1894.

HANS A. FRASCH.

Witnesses:
HARRY Y. DAVIS,
WM. H. FINCKEL.